United States Patent
Blayvas

(10) Patent No.: US 9,432,563 B2
(45) Date of Patent: Aug. 30, 2016

(54) THREE-DIMENSIONAL IMAGING THROUGH MULTI-IMAGE PROCESSING

(75) Inventor: Ilya Blayvas, Holon (IL)

(73) Assignee: Broadcom Corporation, Irvine, CA (US)

(*) Notice: Subject to any disclaimer, the term of this patent is extended or adjusted under 35 U.S.C. 154(b) by 931 days.

(21) Appl. No.: 13/569,382

(22) Filed: Aug. 8, 2012

(65) Prior Publication Data

US 2014/0043435 A1 Feb. 13, 2014

(51) Int. Cl.
*G01C 3/08* (2006.01)
*H04N 5/232* (2006.01)
*H04N 13/02* (2006.01)

(52) U.S. Cl.
CPC .......... *H04N 5/232* (2013.01); *H04N 13/0235* (2013.01); *H04N 13/0271* (2013.01)

(58) Field of Classification Search
CPC ...................................... H04N 13/02
See application file for complete search history.

(56) References Cited

U.S. PATENT DOCUMENTS

| | | | |
|---|---|---|---|
| 5,793,900 A * | 8/1998 | Nourbakhsh et al. | 382/263 |
| 7,339,993 B1 * | 3/2008 | Brooks et al. | 375/240.26 |
| 2002/0054299 A1 * | 5/2002 | Freifeld | G01B 11/024 356/625 |
| 2007/0159640 A1 * | 7/2007 | Berestov | 356/611 |
| 2008/0253455 A1 * | 10/2008 | Van Zon et al. | 375/240.16 |
| 2009/0059057 A1 * | 3/2009 | Long et al. | 348/343 |
| 2009/0059204 A1 * | 3/2009 | Harris et al. | 356/51 |
| 2009/0208102 A1 * | 8/2009 | Watanabe | 382/168 |
| 2011/0157155 A1 * | 6/2011 | Turner et al. | 345/419 |
| 2013/0329088 A1 | 12/2013 | Blayvas | |

* cited by examiner

*Primary Examiner* — Luke Ratcliffe
*Assistant Examiner* — Samantha K Abraham
(74) *Attorney, Agent, or Firm* — McDermott Will & Emery LLP

(57) ABSTRACT

Embodiments of imaging devices of the present disclosure automatically utilize sequential image captures in an image processing pipeline. In one embodiment, control processing circuitry captures a plurality of sub-frames, each of the sub-frames comprising a representation of a scene captured at a different focus position of a lens. A depth map of the scene may be generated comprising a depth of the portion of the scene based at least upon the focus position at which the one of the sub-frames was captured. An output frame of the scene may also be generated by utilizing pixel values of the sub-frame which are determined to be at optimal focus positions.

20 Claims, 10 Drawing Sheets

THREE-DIMENSIONAL IMAGING THROUGH MULTI-IMAGE PROCESSING

BACKGROUND

Digital imaging devices (e.g., smartphones, tablet computers, still image cameras, video cameras, etc.) are ubiquitous. Traditionally, most digital imaging devices provide content in a two-dimensional (2-D) format. However, three-dimensional (3-D) content acquisition is acquiring ever increasing importance due to various existing and emerging applications such as, for example, 3-D body and face tracking, 3-D scanning or mapping of objects, and other possible applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure provides systems and methods for automatically utilizing sequential image captures in an image processing pipeline of an imaging device such as, for example a digital camera or digital video camera. One of ordinary skill in the art would recognize that the techniques disclosed may also be applied to other contexts and applications as well. For cameras in devices such as, for example, digital cameras, digital video cameras, mobile phones, personal data assistants (PDAs), tablets, portable music players, desktop and/or laptop computers, etc., techniques such as those disclosed herein can improve image quality without incurring significant computational overhead or power costs.

To acquire image data, a digital imaging device may include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline circuitry, which may apply a number of various image processing operations to the image data to generate a full color image that may be stored, transmitted, and/or displayed for viewing on a display device, such as a monitor.

Embodiments of the present disclosure provide various imaging enhancements such as, for example, 3-D imaging, depth of field enhancements, depth maps, noise reduction, high dynamic range (HDR) imaging, and other enhancements, enabled by sequentially capturing multiple 2-D images ("sub-frames") of a scene, each at a different focus position. According to various embodiments, multiple images or frames may be acquired and integrated to produce an output image or frame at an output frame rate. Accordingly, the acquired images or sub-frames may be captured at an accelerated input frame rate to allow for the output image or frame to be generated at the output frame rate. For example, sub-frames may be acquired at an input frame rate of 300 frames per second (300 fps) while the output frame is generated at an output frame rate of 30 fps.

Accordingly, an output frame and potentially a depth map of the scene are created based upon identifying portions of the scene that are sharpest or optimal from among the sub-frames. In order to make an accurate comparison from among the sub-frames, the orientation of the scene within the sub-frames as captured should be substantially similar. One technique for ensuring uniformity is capturing the sub-frames in rapid succession relative to the speed of movement in the scene.

Figure 1:
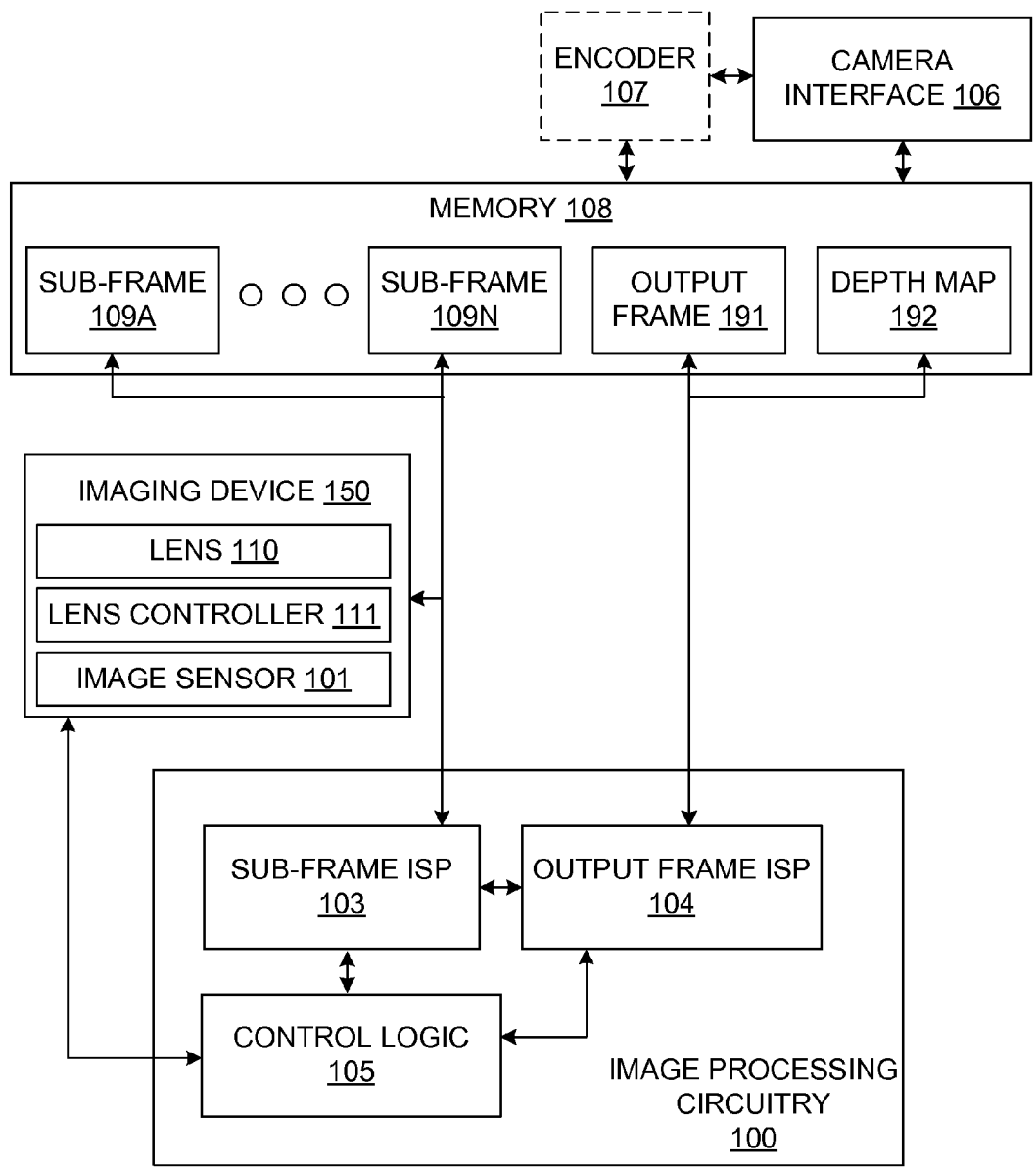
FIG. 1 is a block diagram of one embodiment of image processing circuitry according to the present disclosure.

Referring to FIG. 1, a block diagram of one embodiment of an image processing circuitry 100 is shown for an imaging device 150. The illustrated imaging device 150 may be provided as a digital camera configured to acquire both still images and moving images (e.g., video). The imaging device 150 may include a lens 110, a lens controller 111, and an image sensor 101. The lens controller 111 is configured to adjust at least the focal distance of the lens 110. As a non-limiting example, the lens controller 111 may include a sonic coil actuator, a piezoelectric actuator, and/or other type of motor as can be appreciated. The image sensor 101 may be configured to capture and convert light into electrical signals. As a non-limiting example, the image sensor 101 may include a CMOS (complementary metal-oxide-semiconductor) image sensor (e.g., a CMOS active-pixel sensor (APS)), a CCD (charge-coupled device) image sensor, or other type of image sensor as can be appreciated.

In some embodiments, the image processing circuitry 100 may include various subcomponents and/or discrete units of logic that collectively form an image processing "pipeline" for performing each of various image processing steps. Although the subcomponents are shown as image signal processors (ISPs), the function of the subcomponents may be implemented using other hardware (e.g., digital signal processors (DSPs) or application-specific integrated circuits (ASICs)), software, or via a combination of hardware and software components. The various image processing operations may be provided by the image processing circuitry 100.

The image processing circuitry 100 may include sub-frame ISP(s) 103, an output frame ISP 104, and control logic 105, among others. The analog image signals captured by the image sensor 101 are passed to an analog-to-digital (A/D) converter for conversion into binary values that can be processed by the sub-frame ISP 103. In one embodiment, an image formed on the image sensor 101 by an optical lens 102 is acquired, digitized and transmitted to the sub-frame ISP 103, where it is further processed and stored in memory 108.

In accordance with embodiments of the present disclosure, images or sub-frames may be acquired at an accelerated input frame rate (as compared to an output frame rate for output frame(s)). Therefore, in one embodiment, during acquisition of N sub-frames, the lens 102 periodically moves through its entire focus range, therefore each of the N sub-frames is acquired at its specific focal distance.

Figure 2:
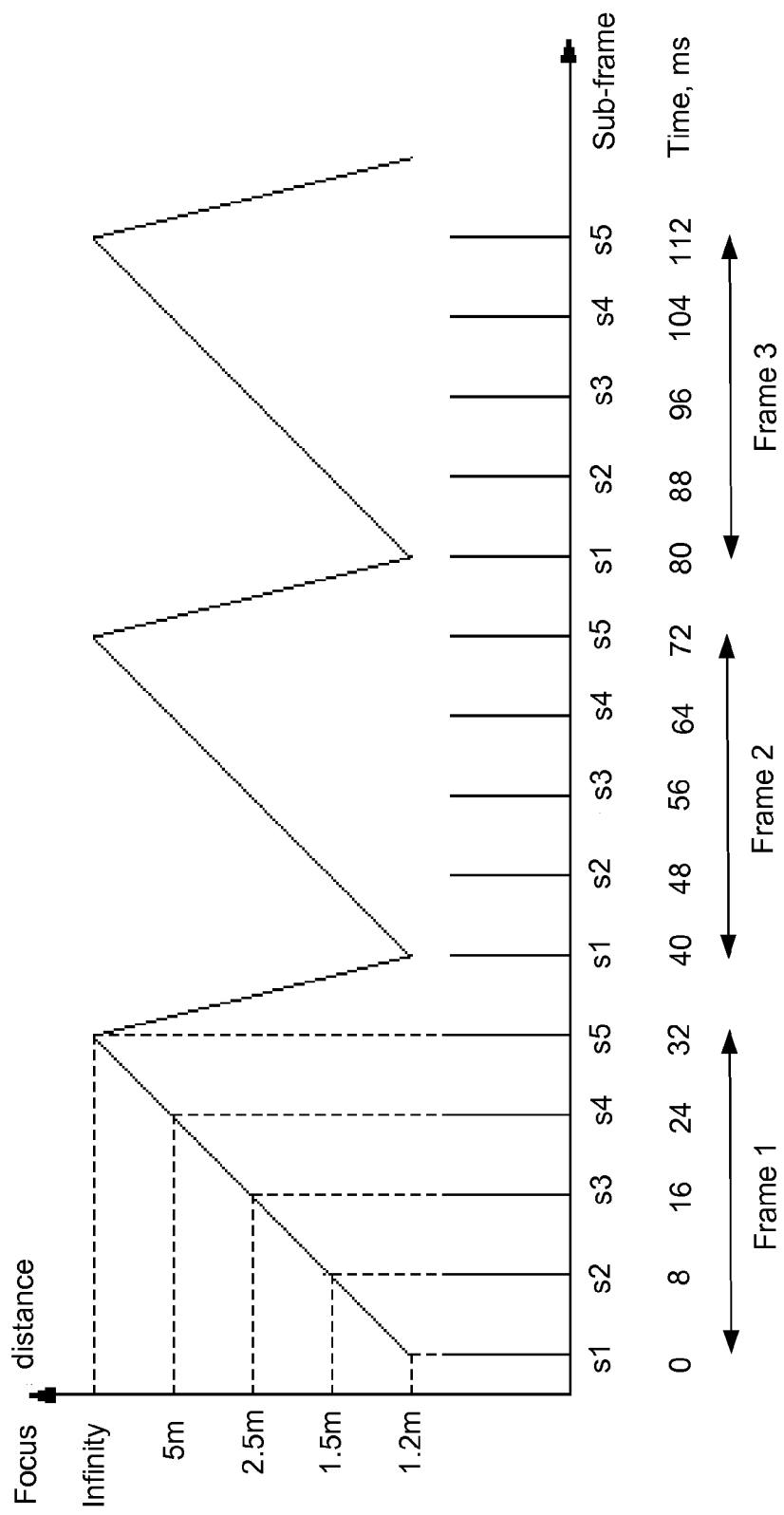
FIG. 2 is an exemplary plot of a time sequence of the sub-frames and corresponding lens positions in accordance with embodiments of the present disclosure.

FIG. 2 illustrates an exemplary time sequence of the sub-frames and corresponding lens positions to help demonstrated how the output frames are formed from the sub-frames, in one embodiment. In this example, it is assumed that the output frame rate is 25 fps, corresponding to 40 ms duration of each output frame. It is also assumed that the duration of each output frame is divided into 5 sub-frames (each having a duration of 8 ms), corresponding to lens focus positions at 1.2 m, 1.5 m, 2.5 m, 5 m, and infinity. In different scenarios and/or embodiments, it is understood that the frame rate, number of sub-frames in the frame, and sub-frame focus positions may be modified, as should be obvious to one skilled in the art.

In one embodiment, the lens controller 111 moves the lens 110 from a near focus position to a far focus position during acquisition of N sub-frames, and cyclically repeats this movement. In the example above, the lens 110 is moved from 1.2 m to infinity during acquisition of 5 sub-frames. In other operation modes or embodiments, the lens controller 111 may sweep the lens 110 within the chosen sub-range of focus distances, e.g. to make objects sharp within the 0.5 m-1 m near sub-range, or within the 3 m-infinity far sub-range, or within any other sub-range, defined by user, image processor, or application.

Therefore, the N sub-frames spans the entire focus range, and a single output frame is formed by output frame ISP 104 from N sub-frames. The sub-frames are stored in the memory 108, during acquisition of each frame. Then, the sub-frames are read from the memory by output frame ISP 104, and from multiple intermediate sub-frames a single output frame is formed by output frame ISP 104. This output frame can be formed by taking the sharpest or optimal pixels from each sub-frame. For each pixel in the scene, a particular sub-frame exists in which this pixel is in focus. Therefore, a pixel value is taken from that particular sub-frame.

Advantageously, such an output frame contains sharp pixel values, since the pixels of the scene lying at distance 2.5 m are taken from the sub-frame corresponding to focus at 2.5 m, while the pixels of the scene lying at distance infinity are taken from the corresponding infinity sub-frame, etc. Further, a depth map of the scene can be formed, because for each pixel, the corresponding sharpest sub-frame is known.

Figure 3:
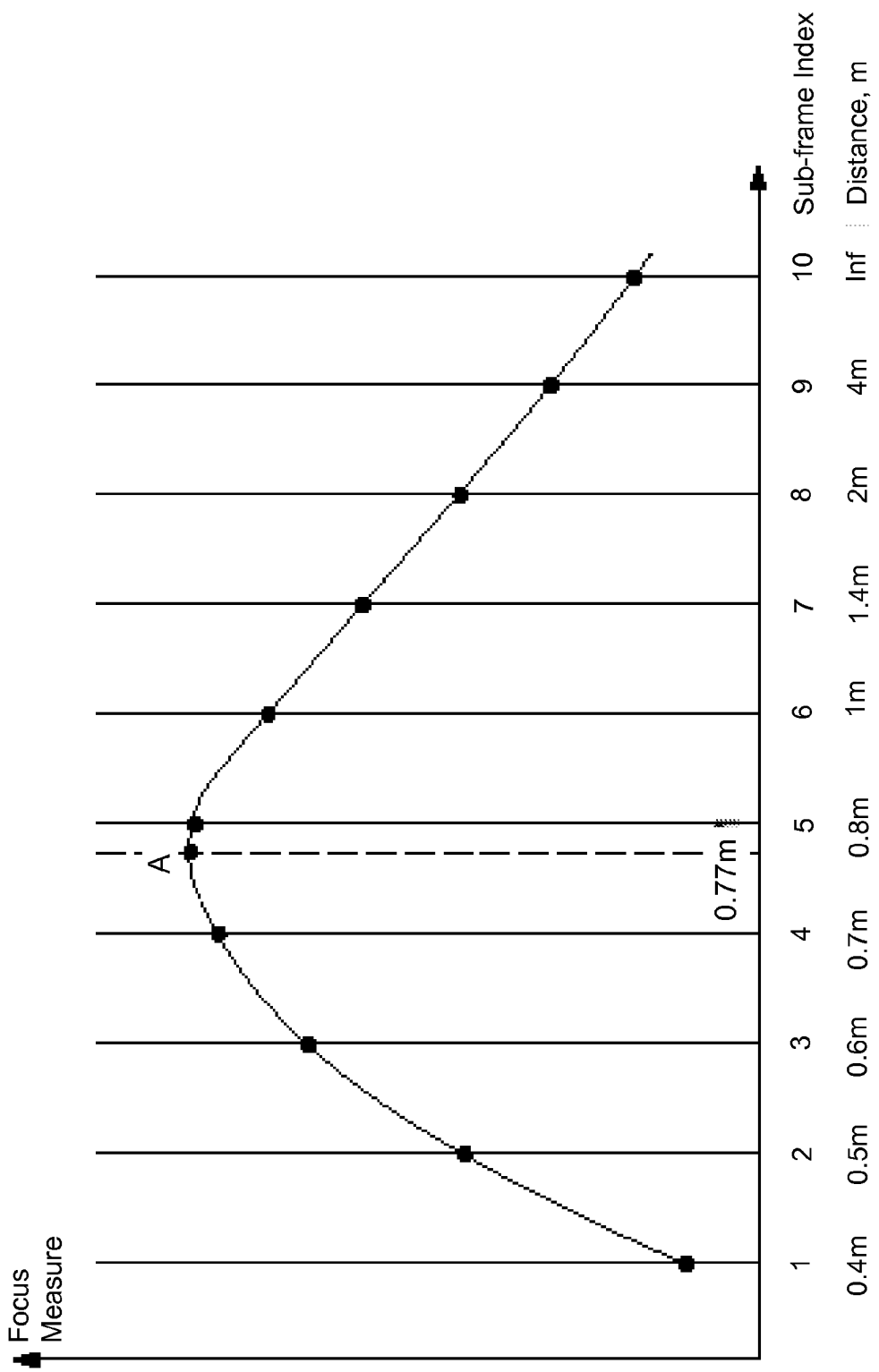
FIG. 3 is an exemplary plot of focus measurements versus focus distances in accordance with embodiments of the present disclosure.

In one embodiment, since each sub-frame corresponds to specific distance to the object in-focus, the distance for each pixel is extracted from a sub-frame index, where the pixel was the sharpest. Referring now to FIG. 3, a plot of focus measurements versus focus distances is provided. In this example, 10 sub-frames are acquired to generate a single output frame. The 10 sub-frames are identified on the plot with a sub-frame index number. In the diagram, sub-frame #5 has the highest focus value amongst the 10 sub-frames acquired. However, interpolation allows for making determinations at higher degrees of accuracy.

As illustrated in FIG. 3, sub-frame #4 corresponds to distance 0.7 m, sub-frame #5 corresponds to 0.8 m, and sub-frame #6 corresponds to 1.0 m. If one considers a specific pixel that is sharpest on sub-frame #5 but is sharper on sub-frame #4 than on sub-frame #6, this pixel may be determined to lie at a distance between 0.7 m and 0.8 m (closer to 0.8 m of #5 than to 0.7 m of #4, since sub-frame #5 was sharper than sub-frame #4). Such system calibration and numerical comparison of sharpness measure allows even higher accuracy in distance estimation. In one embodiment, the sharpness measure can be evaluated as a sum of absolute differences of the pixel value with its nearest neighbors, or as any other sharpness measure known to skilled in the art.

As a result, in one embodiment, a depth map of an image scene can be extracted, since for every pixel of the image, the lens 110 passed through its sharpest focus position, and this sharpest focus position can be evaluated from relative energy of the sharp contents to the blurred contents. Therefore, in a depth map, the focus image information obtained in post-processing can be positioned at appropriate depths based on the analysis of image information from adjacent frame exposures. In addition to generating the depth map that defines a depth of each pixel in an image, a stereoscopic image (or sequence) may also be generated with pixels in the stereoscopic image being offset in accordance with the depth map. Therefore, the depth map may be used to convert a 2-D image to a 3-D image.

Upon receiving the raw image data, the sub-frame ISP 103 may perform one or more image processing operations. As a non-limiting example, the sub-frame ISP 103 may perform Bayer demosaicing, dark current ("black bias") correction, defective pixel correction, white balance and color correction, edge enhancement, noise reduction, and/or other image processing operations as can be appreciated.

Sub-frame ISP 103 might also send control signals to control logic 105, which in turns controls the lens position (focal distance) of the lens 110. In one embodiment, images or frames may be acquired by the imaging device 150 sequentially on frame-by-frame basis with a frame rate of 25, 30, 50, 60 frames-per-second or other frame speed or rate. Also, images may be acquired at an accelerated input frame rate, accessed by output frame ISP 104, and integrated to produce an output image or frame at the frame rate of 25, 30, 50, 60 frames-per-second or other frame speed. For example, the image sensor 101 may acquire the sub-frames at the frame rate of 300 frames per second (300 fps) while the output frame rate is 30 fps. In this case, a single output frame is formed for each 10 sub-frames.

In various embodiments, the frames are taken from the memory 108 for further processing by applications, permanent storage, displaying, video-output, compression or any other purpose by camera interface 106. The imaging device 150 might have zoom lens, or other options and modifications not shown on FIG. 1, obvious to anybody skilled in the art and omitted here for the sake of brevity and/or clarity as less relevant to this disclosure.

In one embodiment, to decrease the processing load on the sub-frame ISP, multiple sub-frame ISPs are used in parallel. For example, if the sub-frame input rate exceeds the output frame rate by the factor of N, N sub-frame ISP's can be used. Therefore, a multiplexor may be used to distribute the image signals to the various sub-frame ISPs 103, in some embodiments. However, the number of sub-frame ISP's does not need to coincide with the frame rate multiplication number, and embodiments where a single sub-frame ISP 103 provides all the processing at the accelerated sub-frame or input frame rate are contemplated.

Referring back to FIG. 1, sub-frames 109*a*-N produced by the sub-frame ISP 103 may be provided to the output frame ISP 104 for additional processing prior to being output through the camera interface 106 (e.g., displayed on a display device, output to a storage device, etc.), or sent to the memory 108. The output frame ISP 104 receives the sub-frames 109*a*-N, either directly from the sub-frame ISP 103 or from memory 108, and may provide for additional processing operations described below in order to produce the output frame 191 and/or depth map 192. The output frame 191 and/or the depth map 192 produced by the output frame ISP 104 may then be sent to memory 108 where they may be accessed by the camera interface 106.

Further, in some implementations, an encoder 107, such as a compression engine, etc., may process the output frame 191 prior to it being read by the camera interface 106. The encoder 107 may be a JPEG (Joint Photographic Experts Group) compression engine for encoding still images, an H.264 compression engine for encoding videos, and/or other type of encoder. Also, it should be noted that the camera interface 106 may also receive raw image data from the memory 108.

The control logic 105 may include a processor 1020 (FIG. 10) and/or microcontroller configured to execute one or more routines (e.g., firmware) that may be configured to determine control parameters for the imaging device 150, as well as control parameters for the output frame ISP 104. By way of example only, the control parameters may include sensor control parameters, camera flash control parameters, lens control parameters (e.g., focal distance for focusing or zoom), or a combination of such parameters for the image sensor(s) 101. The control parameters may also include image processing commands, such as autowhite balance, autofocus, autoexposure, and color adjustments, as well as lens shading correction parameters for the output frame ISP 104. The control parameters may further comprise multiplexing signals or commands for the output frame ISP 104.

Next, a general description of the operation of the various components of the imaging device 150 is provided. To begin, an operator of the imaging device 150 selects a mode of operation for the imaging device 150 and initiates the capture of raw image data by the image sensor 101. In one mode, a plurality of raw frames is captured at a different focus position of the lens 110 at an accelerated input frame rate (as compared to an output frame rate). For example, to produce a 3-D video of 30 frames per second (fps), the image sensor may capture the raw images at a rate of 300 fps. By taking multiple images sequentially and in rapid succession relative to the speed of the scene, the captured scene will be substantially similar in each image. The focus position of the lens 110 may be controlled by control logic 105. Accordingly, the control logic 105 may cause the lens controller 111 to move the lens 110 continuously through the focus range while the image sensor 101 captures images along the way. In some embodiments, the focus range may be less than the complete focus range of the lens 110 based upon a user preference and/or information about the scene provided by sensors available to the imaging device 150.

Upon receiving the raw image data, the sub-frame ISP 103 may perform one or more image processing operations. The sub-frames 109a-N produced by the sub-frame ISP 103 may then be provided to the output frame ISP 104 for additional processing prior to being output through the camera interface 106 (e.g., displayed on display device), or to the memory 108. The output frame ISP 104 receives the "front-end" processed data, either directly from the sub-frame ISP 103 or from memory 108, and may perform one or more of several possible operations discussed below.

In some embodiments, a process element in the output frame ISP 104 may perform an enhanced depth of field process. In a corresponding mode of operation, sub-frames 109a-N are captured. By taking multiple images sequentially and in rapid succession relative to the speed of the scene, image processing in the output frame ISP 104 may then take the sub-frames 109a-N and combine them to produce an output frame 191 with a greater depth of field. To this end, the output frame ISP 104 creates an output frame 191 of the scene using portions of the scene that are the sharpest from among the sub-frames 109a-N. The sharpness may be evaluated using a sum of absolute differences of a pixel value with its nearest neighbors, Fourier analysis, edge detection, and/or techniques as can be appreciated. The resulting output frame 191 created effectively extends the depth of field beyond any one of the individual sub-frames 109a-N by combining the "in-focus" regions of all the sub-frames 109a-N.

Further, in a particular mode of operation, an embodiment of the output frame ISP 104 may compile a depth map of the scene based upon the sub-frames 109a-N from which the output frame 191 is assembled. To this end, each pixel or other portion of the output image 191 is selected from a particular one of the sub-frames 109a-N where the pixel is the sharpest. Since each one of the sub-frames 109a-N is indexed and corresponds to a specific focal distance, the distance between the imaging device 150 and the portion of the scene represented in the pixel may be determined based upon the particular one of the sub-frames 109a-N used to "best" represent the pixel (i.e. the sharpest). In some embodiments, interpolation may be used to determine the distance to each pixel or other portion of the output frame 191 with a higher accuracy than may be determined based upon the focal distance alone.

As a non-limiting example, consider the case when sub-frame 109a corresponds to a focus distance 1.0 meter (m), sub-frame 109b corresponds to a focus distance of 1.1 m, and sub-frame 109c corresponds to a focus distance of 1.2 m. A specific pixel may be sharpest on sub-frame 109b, and sharper on sub-frame 109c than on sub-frame 109a. In this example, the output frame ISP 104 may use interpolation to determine that the portion of the scene captured by the pixel lies at distance between 1.1 and 1.15 meters due to the observation that the pixel was sharper in sub-frame 109c than in sub-frame 109a. Furthermore, system calibration and numerical comparison of sharpness measurements may allow even greater accuracy in distance estimation. Accordingly, output frame ISP 104 may produce a depth map or a sequence of depth maps that are available to be outputted at an output frame rate. For example, stereoscopic content may be distributed as an output image stream combined with a depth map stream at the output frame rate, where the depth map may be used to generate a plurality of stereoscopic image pairs.

In some embodiments, a process element in the output frame ISP 104 may perform an enhanced HDR process. A mode of operation for the enhanced HDR process causes the sub-frames 109a-N to be captured not only at different focus positions, but also at different exposure levels (e.g., different gain settings). These sub-frames 109a-N may then be processed by the output frame ISP 104 to produce an image having an enhanced range for the particular characteristic.

Accordingly, sub-frames can be taken at different exposure or gain level, to produce High Dynamic Range (HDR) output image, where the output pixels for the bright regions are taken from sub-frames with shorter exposure or lower gain, while the pixels for darker regions are taken from sub-frames with longer exposure or smaller gain. For example, if a portion of the sub-frames 109a-N is acceptably sharp in both sub-frame 109a taken with a high exposure and sub-frame 109b taken with a low exposure, then sub-frame 109a may be used to show the details in the dark regions, while sub-frame 109b for the bright regions. In order to increase the probability that a portion of a scene will be acceptably sharp in two or more sub-frames 109a-N representing both a high and a low exposure, the capture rate for sub-frames 109a-N may be increased when using the HDR process. Therefore, higher sub-frame rates can be chosen, so that for any focal distance two or more adjacent sub-frames will be in focus. Additionally, the output frame ISP 104 may employ the focus, gain and brightness of several similarly-focused sub-frames 109a-N in order to further improve the dynamic range of the output image 191 using other HDR techniques as can be appreciated.

In additional embodiments, for a particular mode of operation, a process element in the output frame ISP 104 may perform a motion compensation process. By capturing sub-frames 109a-N sequentially and in rapid succession relative to the speed of the scene, the captured scene will be substantially similar in each sub-frame. However, the scene as represented in the multiple sub-frames 109a-N may have shifted slightly due to relative motion between the scene and the imaging device 150 during the capture process. Therefore, the sub-frames 109a-N may be compared to compensate for the relative motion of the scene within the sequence. For example, a fast moving object in a scene may appear in slightly different locations within each of the sub-frames 109a-N. In order to accurately compare portions of a scene from among the sub-frames 109a-N, the output frame ISP 104 may need to detect and compensate for motion in the scene among the images using various possible motion compensation and/or motion estimation techniques as can be appreciated.

In other embodiments, for a particular mode of operation, a process element in the output frame ISP 104 may perform enhanced noise reduction operations. In these embodiments, corresponding regions of various sub-frames 109a-N may be integrated to assemble the same region of the composite or output frame 191. In particular, various sub-frames 109a-N may be used for darker regions where noise is higher and/or in smoother regions where focus accuracy may not be critical. For example, multiple sub-frames can be used for noise reduction in the output frame, such as in low-light conditions, when the sub-frames are noisy, and/or in the smooth regions, where many sub-frames are still in sufficiently good focus and multiple sub-frames can be integrated together to provide a smooth image with lower noise and more accurate values of pixel colors and intensity.

As a non-limiting example, if the focus of sub-frame 109a is sharpest for a region that is bright with areas of high contrast, then focus accuracy is important, and this region of the output frame 191 may be assembled from only sub-frame 109a. However, as discussed previously, if the region is dark and/or smooth, focus accuracy in this region of the output image 191 may not be paramount. Under these circumstances, the region of the output image 191 may be assembled from sub-frame 109a, as well as sub-frames 109b and 109c in order to provide acceptably sharp focus with lower image noise. Furthermore, the noise reduction operation may assign weights to the regions of the sub-frames 109a-N where the weights are proportional to the sharpness of the regions.

Figure 4:
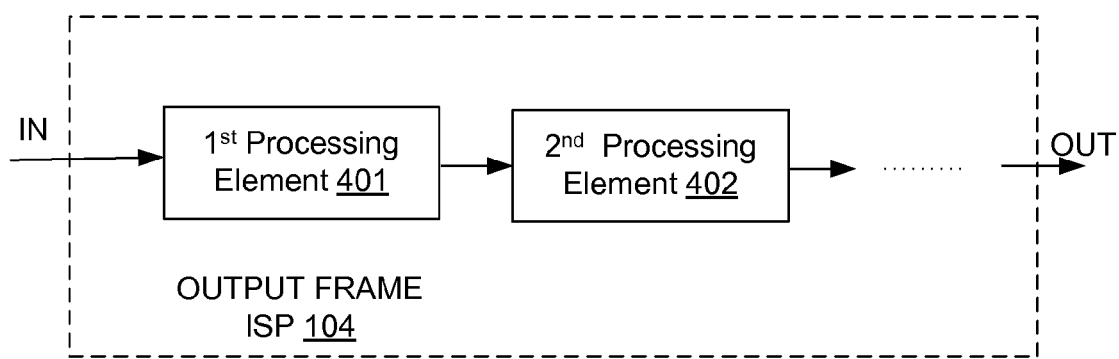
FIGS. 4-7 are block diagrams of embodiments of an image signal processing pipeline implemented by the output frame ISP of the image processing circuitry of FIG. 1.
Figure 10:
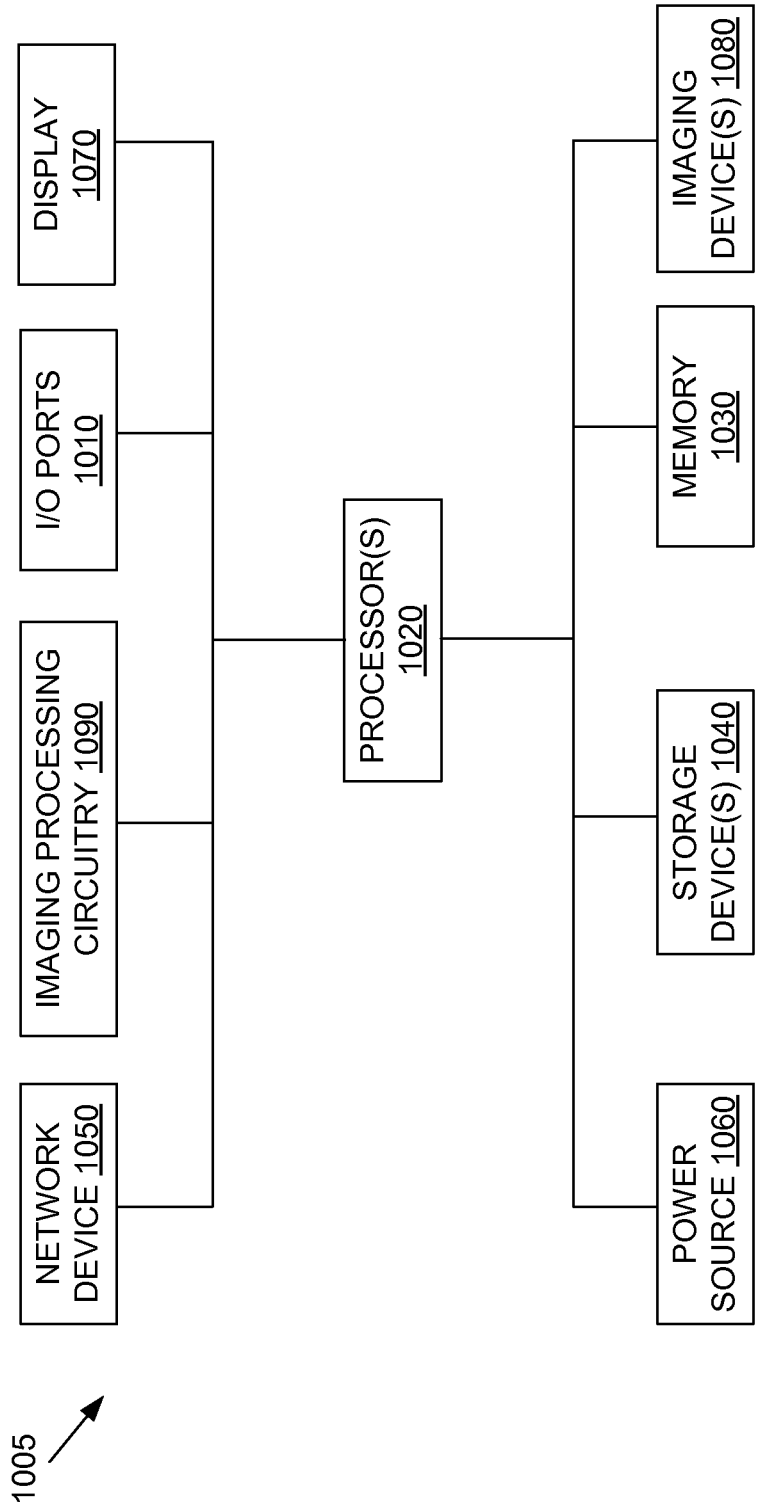
FIG. 10 is a block diagram illustrating an embodiment of an electronic device employing the image processing circuitry of FIG. 1.

Referring now to FIG. 4, one embodiment of the output frame ISP 104 may send image information to a first process element 401 which may take the sub-frames 109a-N and generate an output frame 191 for output on the camera interface 106 and/or for further processing by a downstream process element such as the second processing element 402. Accordingly, the processing pipeline may be considered as a series of specialized algorithms that adjusts image data in real-time and is often implemented as an integrated component of a system-on-chip (SoC) image processor. With an image signal processing pipeline implemented in hardware, front-end image processing can be completed without placing any processing burden on the main application processor 1020 (FIG. 10).

Figure 5:
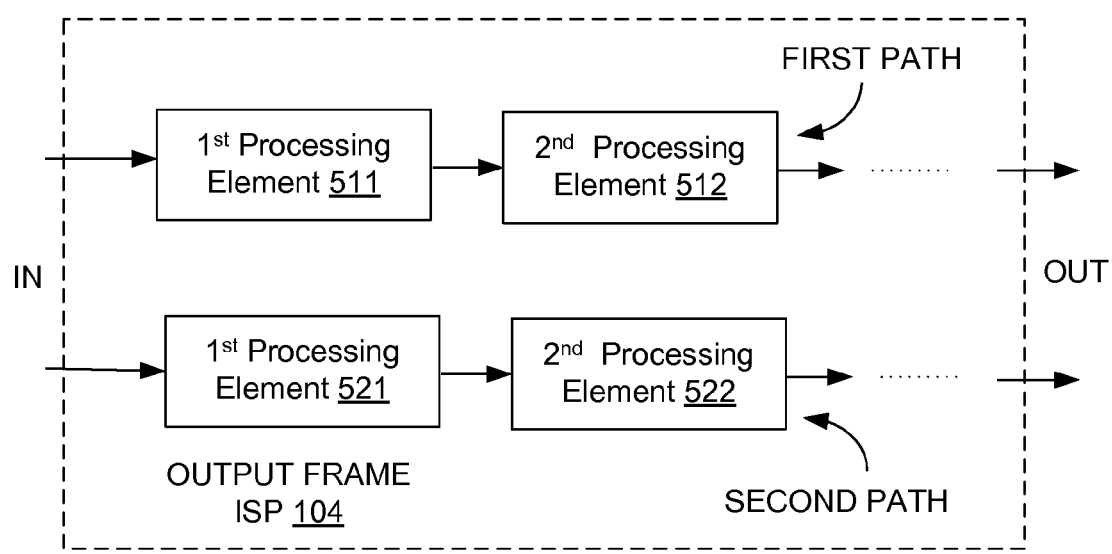

Referring next to FIG. 5, in one embodiment, an image signal processing pipeline implemented by output frame ISP 104 contains a plurality of parallel paths instead of a single linear path. As a non-limiting example, the parallel paths may provide a first path and a second path. Therefore, while a first sub-frame 109 is being processed in the first path, a second sub-frame 109 may be processed in the second and parallel path. It may be that the second path contains fewer stages or elements 521, 522 than the first path. Alternatively, the first path may contain the same number of or less number of stages or elements 511, 512 as compared to the second path. Further, the second path may involve resolution down-conversion of the image to lessen the amount of pixels that need to be processed during image processing, such as for image analysis, in the pipeline. The benefits of the parallel paths may apply to still images as well as video images captured by the image sensor 101 (FIG. 1). Use of parallel paths in the image signal processing pipeline may enable processing of multiple image data simultaneously while maximizing final image quality.

Figure 6:
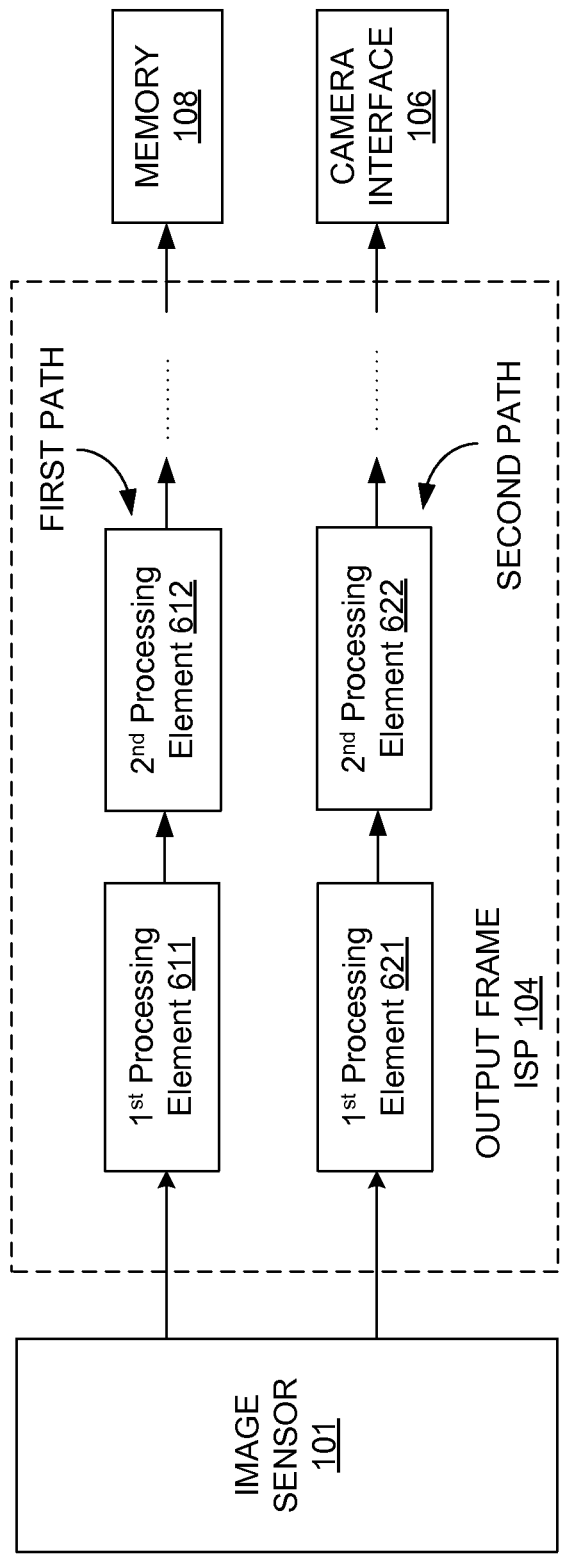

Referring to FIG. 6, in one embodiment of an image processing pipeline implemented in the output frame ISP 104, processing elements 611, 612, may be divided up between elements that are suited for the main output frame 191 and processing elements 621, 622 that are suited for a secondary frame.

In some embodiments, similar pixels in the sub-frames 109a-N may be processed once and then disparate pixels will be processed separately. It is noted that by taking multiple sub-frames 109a-N sequentially and in rapid succession relative to the speed of the scene, the captured scene will be substantially similar in each sub-frame 109. Therefore, pixels of a first sub-frame 109a may be processed in a main path of the pipeline. Additionally, similar pixels in a second sub-frame 109b may be identified with a similarity mask, where the similar pixels are also contained in the first sub-frame 109a (and are already being processed). After removal of the similar pixels in the second sub-frame 109b, the remaining pixels may be processed in a secondary path of the pipeline. By removing redundant processing, significant power savings in the output frame ISP 104 may be realized.

Further, in some embodiments, the images generated by the first and second paths may be simultaneously displayed. For example, one portion of a display can be used to show a video (e.g., output from the first path) and a second portion of the display can be used to show a still image or "snapshot" from the video (e.g., output from the second path) which is responsive to a pause button on an interface of the imaging device 150 (FIG. 1). Alternatively, an image frame may be shown in a split screen of the display (e.g., left section) and another image frame may be shown in a right section of the display. The imaging device 150 may be configured to allow for a user to compare and select a combination of sub-frames 109a-N (e.g., the frames being displayed in the split screen) for processing by the output frame ISP 104 to generate an output frame 191 having improved image quality.

As previously mentioned, embodiments of the imaging device 150 may employ modes of operation that are selectable from interface elements of the device. Interface elements may include graphical interface elements selectable from a display or mechanical buttons or switches selectable or switchable from a housing of the imaging device 150. In one embodiment, a user may activate an enhanced mode of operation, where multiple images are captured and used to produce an image with enhanced characteristics (e.g., 3-D, HDR, etc.) that may be viewed or saved in memory 108.

Figure 7:
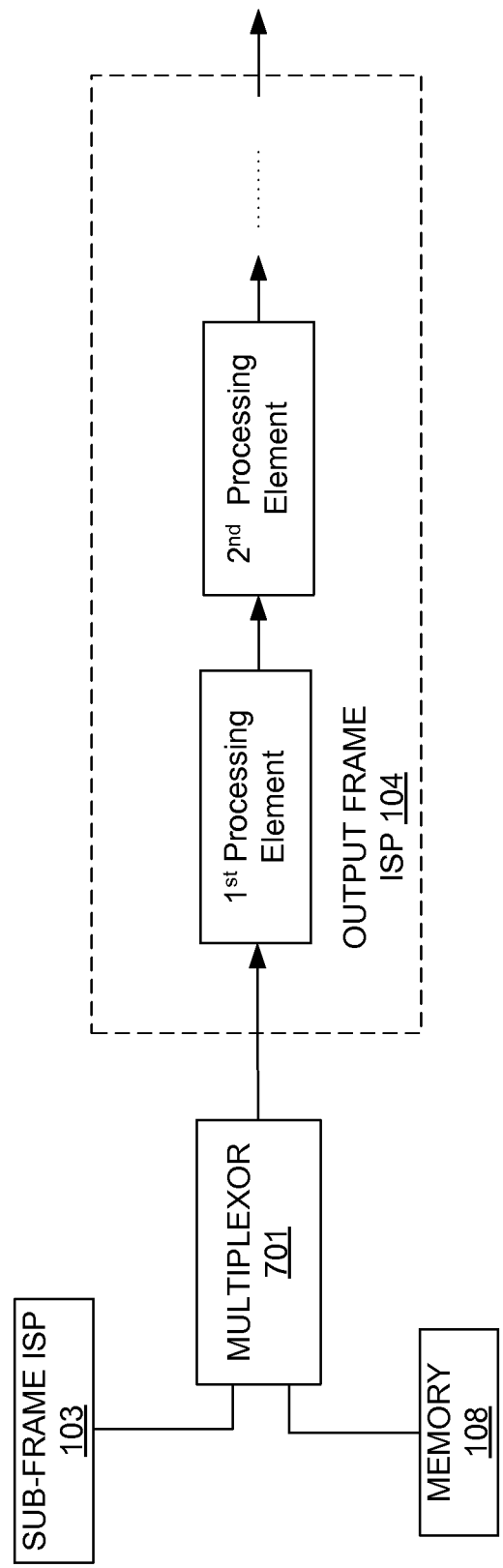

Referring to FIG. 7, in some embodiments, multiplexing may be used for the image processing pipeline implemented in the output frame ISP 104. The single image pipeline in the output frame ISP 104 (FIG. 1) can therefore be multiplexed by a multiplexor 701 between a plurality of sub-frames 109a-N that are being input in parallel to the pipeline from the sub-frame ISP 103 (FIG. 1) and/or memory 108 (FIG. 1). In some embodiments, the functionality of the multiplexor 701 may be embodied within the output frame ISP 104.

Therefore, instead of processing one of the output frames 191 and/or sub-frames 109a-N in its entirety after the other has been processed in its entirety, the frames can be processed concurrently by switching processing between one another as permitted by output frame ISP 104. This reduces latency by not delaying processing of an image until completion of the other image, and processing of the two images will finish more quickly.

Figure 8:
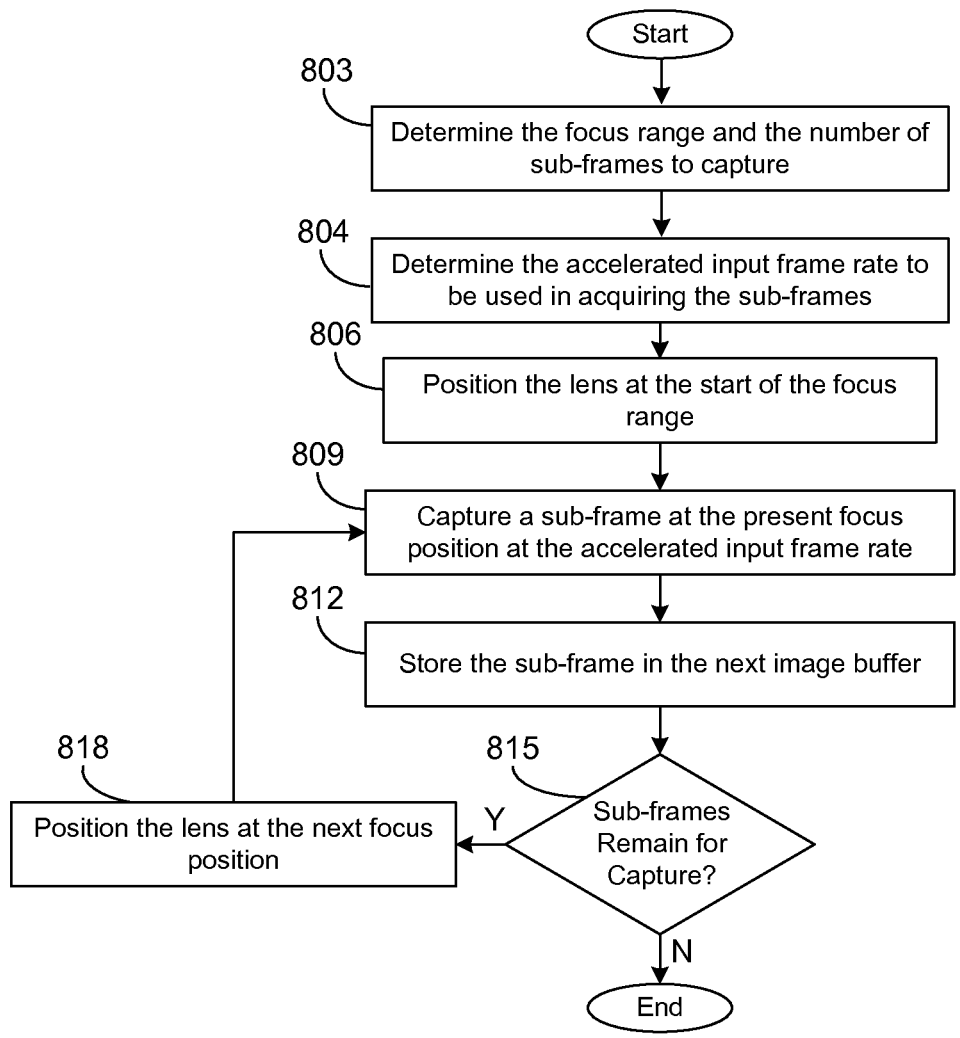
FIGS. 8 and 9 are flow chart diagrams depicting various functionalities of embodiments of image processing circuitry of FIG. 1.

Referring next to FIG. 8, shown is a flow chart that provides one example of the operation of a portion of the control logic 105 (FIG. 1) according to various embodiments. It is understood that the flow chart of FIG. 8 provides merely an example of the many different types of functional arrangements that may be employed to implement the operation of the portion of the control logic 105 as described herein. As an alternative, the flow chart of FIG. 8 may be viewed as depicting an example of operations or actions of a method implemented in the electronic device 1005 (FIG. 10) according to one or more embodiments.

Beginning in block 803, the control logic 105 determines the focus range to be used to capture a sequence of sub-frames 109a-N (FIG. 1) and the number of sub-frames to capture. The focus range may be the complete focus range of a lens 110 (FIG. 1) or the range may be limited to a shorter range. As a non-limiting example, using a shorter range may be appropriate if all the objects in a scene are near such that using a focus of infinity would not produce any objects in focus. The number of sub-frames 109a-N to capture may be based upon the depth of field for each captured sub-frame 109, the capability of the imaging device, user preference, and/or other factors. An accelerated frame rate to be used to acquire the number of sub-frames may then be determined based on an output frame rate, in block 804.

Next, in block 806, the control logic 105 instructs the lens controller 111 (FIG. 1) to position the lens 110 at the start of the focus range. Then, in block 809, the control logic 105 instructs the image sensor 101 (FIG. 1) to capture a sub-frame 109 at the present focus position at the accelerated input frame rate. Subsequently, in block 812, the control logic 105 may store the captured sub-frame 109 in a memory 108 (FIG. 1). Next, in block 815, the control logic 105 may determine if further sub-frames 109a-N remain to be capture for a given sequence. If all the sub-frames 109a-N for a sequence has been captured, execution of this portion of the control logic 105 ends as shown.

Alternatively, if additional sub-frames 109a-N remain to be captured, in block 818, the control logic 105 positions the lens 110 at the next focus position and execution of the control logic 105 returns to block 809. In some embodiments, the lens 110 may continuously move during the capture process. In these embodiments, the control logic 105 in block 818 may not move the lens into position, but may instead determine the current position of the lens 110.

Figure 9:
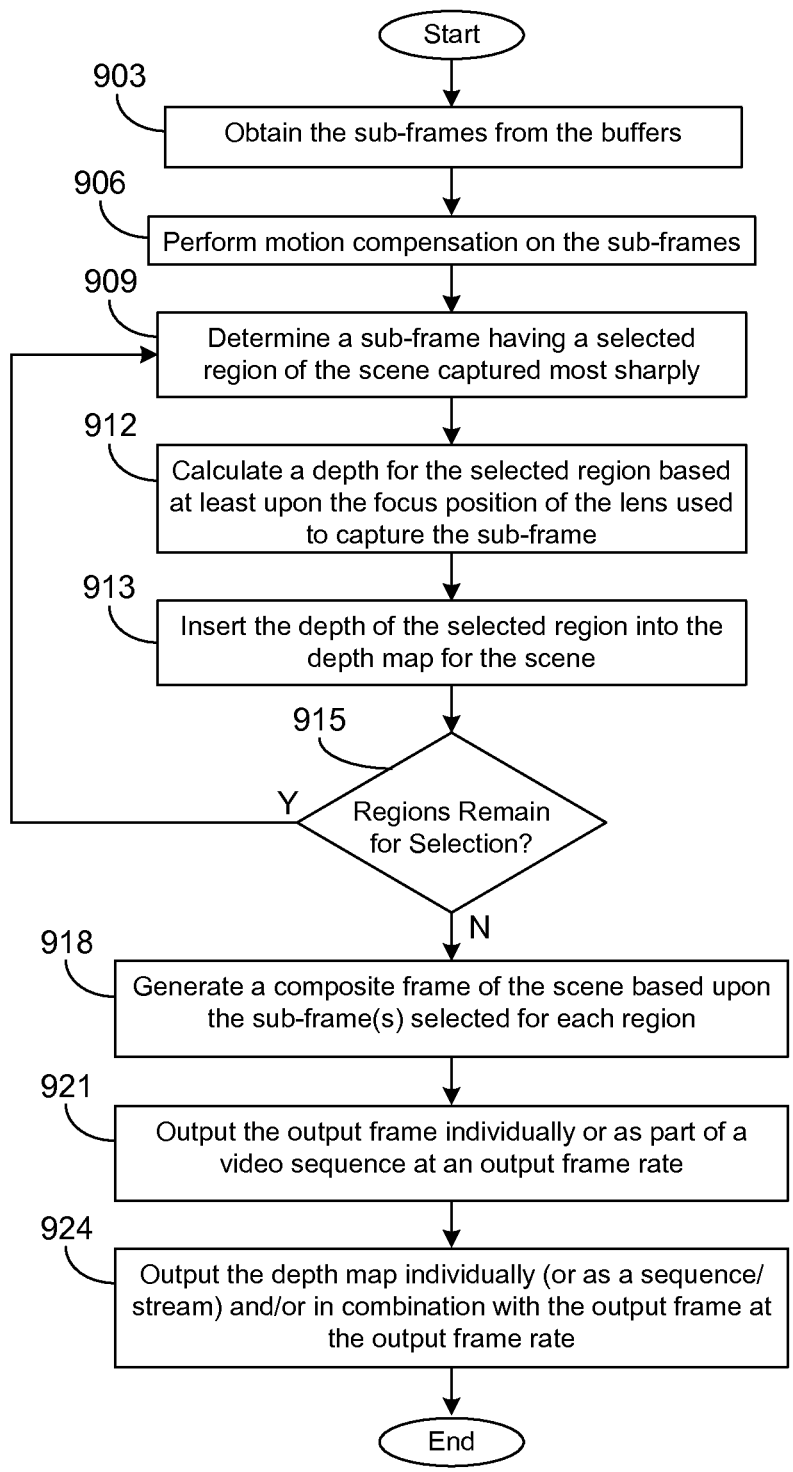

Next, referring to FIG. 9, shown is a flow chart that provides an additional example of the operation of a portion of the output frame ISP 104 according to various embodiments. Beginning in block 903, the output frame ISP 104 may obtain captured sub-frames 109a-N (FIG. 1) from the memory 108 (FIG. 1) and/or sub-frame ISP 103 (FIG. 1). Next, in block 906, the output frame ISP 104 may apply motion compensation to adjust for relative movement in the scene among the sub-frames 109a-N. By taking multiple sub-frames 109a-N sequentially and in rapid succession relative to the speed of the scene, the captured scene will be substantially similar in each sub-frame 109. However, the scene as represented in the sub-frames 109a-N may have shifted slightly due to relative motion between the scene and the imaging device 150 during the capture process. Therefore, in the image process, the sub-frames 109a-N may be compared to compensate for the relative motion of the scene among the sub-frames 109a-N.

Then, in block 909, the output frame ISP 104 may compare the sharpness of a selected portion of the scene as captured in the sub-frames 109a-N. The size of the portion examined may be a pixel or may be a larger area such as, for example, a macroblock. The comparison of sharpness may be carried out using a sum of absolute differences of a pixel value with its nearest neighbors, Fourier analysis, edge detection, and/or techniques as can be appreciated.

Next, in block 912, the output frame ISP 104 may calculate the distance to a given portion of the scene as determined by the focus position of the lens 110 used to capture the particular sub-frame 109 in which the given portion of the scene is the sharpest. As discussed previously, in some embodiments, interpolation for the given portion of the scene may be used in order to further improve the accuracy of the distance measurement. Subsequently, in block 913, the output frame ISP 104 may insert the calculated depth of the portion of the scene into a depth map 192 (FIG. 1) being compiled for the entire scene.

Then, in block 915, the output frame ISP 104 determines if additional portions of the scene captured in the sub-frames 109a-N exist for which a depth has not been determined. If additional portions remain for determination, execution of the output frame ISP 104 returns to block 909. Alternatively, if all the portions of the scene have been measured, then, in block 918, the output frame ISP 104 may begin generating an output frame 191 using portions of one or more of the sub-frames 109a-N selected to represent each region of the output frame 191. Therefore, the output frame 191 individually or as part of a video sequence may be output at an output frame rate, in block 921. Further, the depth map 192 may be output individually (or as a sequence/stream) and/or in combination with the output frame 191 at the output frame rate, in block 924. For example, output frame ISP 104 may use the depth map 1192 and an output image or frame 191 to generate a stereoscopic image or sequence, in some embodiments. In one embodiment, a stereoscopic image (or sequence) may also be generated, by the output frame ISP 104, with pixels in the stereoscopic image being offset in accordance with the depth map 192. Thereafter, this portion of the execution of the output frame ISP 104 ends as shown.

Referring to FIG. 10, shown is a block diagram illustrating an example of an electronic device 1005 that may provide for the processing of image data using one or more of the image processing techniques described above. The electronic device 1005 may be any type of electronic device, such as a digital camera, a video camera, a laptop, a desktop computer, a mobile phone, a tablet computer, a digital media player, and/or any device that is configured to receive and process image data, such as data acquired using one or more image sensing components (e.g., image sensor 101).

The electronic device 1005 may include various internal and/or external components which contribute to the function of the device 1005. Those of ordinary skill in the art will appreciate that the various functional blocks shown in FIG. 10 may comprise hardware elements (including circuitry), software elements (including computer code stored on a computer readable medium) or a combination of both hardware and software elements. For example, in the presently illustrated embodiment, the electronic device 1005 may include input/output (I/O) ports 1010, one or more processors 1020, memory device 1030, storage device 1040, networking device 1050, power source 1060, and display 1070. Additionally, the electronic device 1005 may include imaging devices 1080, such as digital cameras or image sensors 101, and image processing circuitry 1090. As will be discussed further below, the image processing circuitry 1090 may be configured to implement one or more of the above-discussed image processing techniques when processing image data. As can be appreciated, image data processed by image processing circuitry 1090 may be retrieved from the memory 1030 and/or the non-volatile storage device(s) 1040, or may be acquired using the imaging device 1080.

It should be understood that the system block diagram of the electronic device 1005 shown in FIG. 10 is intended to be a high-level control diagram depicting various components that may be included in such an electronic device 1005. That is, the connection lines between each individual component shown in FIG. 10 may not necessarily represent paths or directions through which data flows or is transmitted between various components of the electronic device 1005. Indeed, as discussed above, the depicted processor(s) 1020 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Any process descriptions or blocks in flow charts should be understood as representing modules, segments, or portions of code which include one or more executable instructions for implementing specific logical functions or actions in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. An imaging device, comprising:
an optical lens adapted to form a focused image at a plurality of focus distances;
an image sensor adapted to transform an optical image formed by the optical lens into a digital signal representing the optical image;
a memory that stores acquired sub-frames, wherein each of the acquired sub-frames comprises a digital signal representation of an optical image of an object from the image sensor, the optical image being captured at a focus distance from the optical lens corresponding to a focus position of the optical lens, the focus position being different for each of the acquired sub-frames; and
processing circuitry configured to:
process the acquired sub-frames and form a single output frame from the acquired sub-frames acquired at different optical lens focus positions by identifying, for each pixel in the single output frame, a value of a pixel in one of the acquired sub-frames that has an optimal focus value as compared to corresponding pixel values in remaining ones of the acquired sub-frames and using the identified value of the pixel in the single output frame, and
calculate a depth map for the single output frame based at least in part on the focus positions of the acquired sub-frames, the depth map representing, for each pixel selected for the single output frame, a corresponding focus distance of the pixel, the corresponding focus distance of at least one pixel being interpolated based at least in part on another focus value of another pixel in another one of the acquired sub-frames that has a second most optimal focus value as compared to the corresponding pixel values in the remaining ones of the acquired sub-frames.

2. The imaging device of claim 1, wherein the optical lens is swept within a defined focus range within a time interval of a single output video frame, wherein the acquired sub-frames are captured during the time interval to produce a video stream at a constant output frame rate by the processing circuitry.

3. The imaging device of claim 1, wherein each of the acquired sub-frames is further captured at different exposure values.

4. The imaging device of claim 3, wherein the processing circuitry is further configured to select ones of the acquired sub-frames with shorter exposure values to be used to produce output pixel values for brighter regions in a scene, wherein sub-frames with longer exposure values are used to produce output pixel values for darker regions in the scene.

5. The imaging device of claim 1, further comprising logic that determines a count of the acquired sub-frames needed, wherein an input frame rate for acquiring the acquired sub-frames is determined based on dividing an output frame rate by the count.

6. The imaging device of claim 1, wherein the optimal focus value is identified by measuring a sharpness value of a pixel amongst the acquired sub-frames, wherein a degree of sharpness of the pixel in each respective acquired sub-frame of the acquired sub-frames is measured as a sum of absolute differences with a plurality of adjacent pixels in each respective acquired sub-frame of the acquired sub-frames.

7. The imaging device of claim 1, wherein each of the acquired sub-frames are captured at a degree of exposure, the degree of exposure being different for a subset of the acquired sub-frames, and the single output frame being a high dynamic range (HDR) frame comprising a plurality of pixels selected from the subset of the acquired sub-frames.

8. The imaging device of claim 1, wherein the processing circuitry is further configured to generate a video based upon a temporal sequence of frames comprising the single output frame.

9. The imaging device of claim 1, wherein the processing circuitry is further configured to:
combine the depth map with the single output frame to generate a stereoscopic image, wherein pixels of the stereoscopic image are offset based at least on the depth map.

10. A method, comprising:
capturing, in an imaging device, a plurality of sub-frames at an input frame rate, each of the plurality of sub-frames comprising a representation of an object captured at a focus position of a lens, the focus position being different for each of the plurality of sub-frames;
identifying, in the imaging device, one of the plurality of sub-frames having a portion of the object captured in a region, the region having a focus accuracy at least as great as a corresponding region of remaining ones of the plurality of sub-frames used to capture the portion;
calculating, in the imaging device, a depth map stream for the object, at least one of the depth maps of the depth map stream being based at least upon the focus position at which the one of the plurality of sub-frames was captured, the at least one of the depth maps comprising a focus distance of the portion of the object; and
generating a stream of output frames comprising the object at an output frame rate utilizing regions of the plurality of sub-frames which are determined to be at optimal focus positions, the at least one of the output frames based at least upon the region of the one of the plurality of sub-frames and the at least one of the depth maps, wherein the output frames comprise stereoscopic images having pixels that are offset based at least on the depth maps of the depth map stream.

11. The method of claim 10, wherein the input frame rate is greater than the output frame rate.

12. The method of claim 11, further comprising generating, in the imaging device, a video based upon a temporal sequence of the stream of output frames.

13. The method of claim 12, wherein the at least one of the output frames is generated within a measure of time corresponding to a frame rate of the video, and the plurality of sub-frames are captured within the measure of time.

14. The method of claim 10, wherein a count of the plurality of sub-frames captured varies based a selected focus range of the lens.

15. The method of claim 10, wherein the method further comprises:

identifying, for each pixel in the at least one of the output frames, a value of a pixel in one of the plurality of sub-frames that has an optimal focus value as compared to corresponding pixel values in remaining ones of the plurality of sub-frames and using the identified value of the pixel in the at least one of the output frames, wherein the at least one of the depth maps represents, for each pixel selected for the at least one of the output frames, a corresponding focus distance of the pixel, the corresponding focus distance of at least one pixel being interpolated based at least in part on another focus value of another pixel in another one of the plurality of sub-frames that has a second most optimal focus value as compared to the corresponding pixel values in the remaining ones of the plurality of sub-frames.

16. A computer program product comprising instructions stored in a non-transitory computer-readable storage medium, the instructions comprising:
instructions to capture of a plurality of sub-frames at an input frame rate by an optical lens, each of the plurality of sub-frames comprising a representation of an object captured at a focus position of the optical lens, the focus position being different for each of the plurality of sub-frames;
instructions to identify one of the plurality of sub-frames having a portion of the object captured in a region, the region having a focus accuracy at least as great as a corresponding region of remaining ones of the plurality of sub-frames used to capture the portion;
instructions to compile a depth map of the object based at least upon the focus position at which the one of the plurality of sub-frames was captured, the depth map comprising a focus distance of the portion of the object; and
instructions to combine the depth map with a single output frame to generate a stereoscopic image, wherein pixels of the stereoscopic image are offset based at least on the depth map that comprises the focus distance of the portion of the object.

17. The computer program product of claim 16, wherein the instructions further comprise:
instructions to generate output frames of the object at an output frame rate utilizing regions of the plurality of sub-frames which are determined to be at optimal focus positions, the output frames comprising the single output frame and the single output frame being based at least upon the region of the one of the sub-frames and the depth map, wherein the input frame rate is greater than the output frame rate;
instructions to generate a depth map stream that comprises the depth map; and
instructions to output an output video stream comprising the output frames, wherein each of the output frames is combined with a respective depth map of the depth map stream at the output frame rate to generate stereoscopic images from the output frames, the stereoscopic images being output as part of the output video stream, and pixels of the stereoscopic images being offset based at least on the respective depth map of the depth map stream.

18. The computer program product of claim 17, wherein the plurality of sub-frames are captured at different exposure levels.

19. The computer program product of claim 16, wherein the instructions further comprise:
instructions to cause the optical lens to be swept within a defined focus range within a time interval of a single output video frame, wherein the plurality of sub-frames are captured during the time interval to produce a video stream at a constant output frame rate.

20. The computer program product of claim 16, wherein the instructions further comprise:

instructions to identify, for each pixel in the single output frame, a value of a pixel in one of the plurality of sub-frames that has an optimal focus value as compared to corresponding pixel values in remaining ones of the plurality of sub-frames and using the identified value of the pixel in the single output frame, wherein the depth map represents, for each pixel selected for the single output frame, a corresponding focus distance of the pixel, the corresponding focus distance of at least one pixel being interpolated based at least in part on another focus value of another pixel in another one of the plurality of sub-frames that has a second most optimal focus value as compared to the corresponding pixel values in the remaining ones of the plurality of sub-frames.

* * * * *